United States Patent [19]
Sugihara

[11] Patent Number: 6,119,745
[45] Date of Patent: Sep. 19, 2000

[54] PNEUMATIC TIRE INCLUDING ONLY ONE WIDE GROOVE

[75] Inventor: Hideaki Sugihara, Amagasaki, Japan

[73] Assignee: Sumitomo Rubber Industries, Ltd., Hyogo-ken, Japan

[21] Appl. No.: 08/933,980

[22] Filed: Sep. 19, 1997

Related U.S. Application Data

[63] Continuation of application No. 08/419,937, Apr. 11, 1995, abandoned.

[30] Foreign Application Priority Data

Apr. 11, 1994 [JP] Japan .................................. 6-098035

[51] Int. Cl.⁷ ............................ B60C 11/03; B60C 11/12; B60C 11/13; B60C 111/00
[52] U.S. Cl. .................. 152/209.9; 152/209.15; 152/209.24; 152/209.26; 152/209.27; 152/DIG. 3
[58] Field of Search ......................... 152/209 R, 209 A, 152/209 D, DIG. 3, 209.9, 209.15, 209.24, 209.25, 209.26, 209.27, 209.18; D12/147

[56] References Cited

U.S. PATENT DOCUMENTS

| | | | |
|---|---|---|---|
| 4,700,762 | 10/1987 | Landers | 152/209 R |
| 5,337,815 | 8/1994 | Graas | 152/209 R |
| 5,358,022 | 10/1994 | Glover et al. | 152/209 R |
| 5,360,043 | 11/1994 | Croyle et al. | 152/209 A |
| 5,425,406 | 6/1995 | Swift et al. | 152/209 R |
| 5,435,365 | 7/1995 | Tanaka | 152/209 R |
| 5,450,885 | 9/1995 | Hanya | 152/209 R |
| 5,472,030 | 12/1995 | Shibata et al. | 152/209 R |
| 5,810,953 | 9/1998 | Tanaka et al. | 152/209 R |

FOREIGN PATENT DOCUMENTS

| | | | |
|---|---|---|---|
| 0590526 | 4/1994 | European Pat. Off. | |
| 0593288 | 4/1994 | European Pat. Off. | |
| 2484336 | 12/1981 | France | |
| 3-10908 | 1/1991 | Japan | 152/209 R |
| 139402 | 6/1991 | Japan | 152/209 R |

OTHER PUBLICATIONS

Boltze, New Ways to Combat Hydroplaning=Developing the Aqvacontact, May 1992.

*Primary Examiner*—Steven D. Maki

[57] ABSTRACT

A pneumatic tire has a tread portion with one circumferential wide groove extending continuously in the circumferential direction. A centroid of the cross-section of the circumferential wide groove deviates from the tire's equatorial plane so as to divide the tread part into a narrow tread section and a broad tread section. One of the groove walls extends along a curve convexed outwardly in the tire radial direction from one of the bottom edges of the circumferential wide groove and is smoothly connected to the outer surface of the tread portion. When the tire is mounted on a regular rim, inflated with regular internal pressure and applied with a normal load, the groove width GW of the circumferential wide groove is defined to be not less than 35 mm and not more than 0.35 times the ground contact width TW of the tread part.

13 Claims, 9 Drawing Sheets

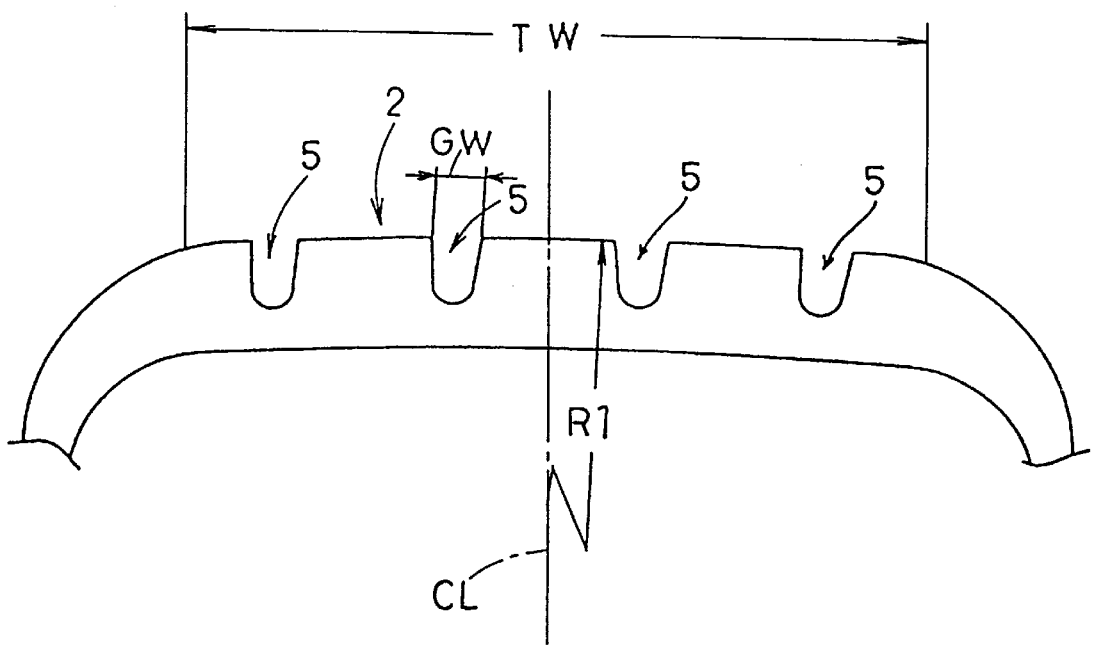
Fig. 9 CONVENTIONAL

PNEUMATIC TIRE INCLUDING ONLY ONE WIDE GROOVE

This application is a continuation, of application Ser. No. 08/419,937 filed on Apr. 11, 1995, now abandoned.

BACKGROUND OF THE INVENTION

The present invention relates to a pneumatic tire, particularly to a low aspect radial tire for passenger vehicles, capable of providing higher cornering power so as to improve steering stability, while enhancing dry and wet grip performances and reduction of pass-by noise.

Field of the Invention

Recently, as automobiles become more quiet, tire noise now contributes at a higher ratio to the total noise level of the automobile. Thus, a reduction in tire noise is demanded. Such noise reduction is specifically desired in a range of around 1 kHz, which forms the peak frequency of tire noise, and sounds due to columnar resonance generated by the circumferential grooves is one of the main sound sources in such a high frequency range.

On the other hand, in order to maintain wet grip performance, the tread of a tire is generally provided with a plurality of circumferential grooves continuously extending in the circumferential direction of the tire.

In such a tire, when it is in contact with the ground, a kind of air column is formed by the road surface and the circumferential groove. A sound of specific wavelength, which is double the wave length of the air column is caused by the airflow within the column during running.

Such a phenomenon is referred to as a columnar resonance, and provides the main source of noise at 800 to 1.2 kHz. The wavelength of the columnar resonance sound is approximately constant, giving a constant frequency regardless of the tire's speed, and thus increases the sound inside and outside of the automobile. Incidentally, since this noise of around 1 khz is a sound easily heard by the human ear, the increase of noise with this frequency greatly influences tire noise performance.

Although reduction of the number or volume of the circumferential grooves is known to prevent columnar, such reductions lead to a lower wet grip performance.

On the other hand, although wet grip performance can be increased by increasing the number or volume of circumferential grooves, a simple increase causes a reduction of the dry grip performance, because the ground-contact area is reduced. Also, this causes a reduction in steering stability as the rigidity of the tread pattern is reduced, in addition to an increase in tire noise.

To achieve such contradictory performances, it has been attempted to satisfy both wet grip performance and steering stability by broadening the groove width of the circumferential groove, and arranging the number, such as two or four, about the tire equator.

In a tire of such a constitution, however, when the load acting on the tire shifts in the tire axial direction at the time of cornering, since the groove volume is large, the ground contact pressure increases abnormally at the load shifting side, and the steering stability in cornering, or the so-called turning steering stability becomes inferior.

SUMMARY OF THE INVENTION

It is hence a primary object of the present invention to present a pneumatic tire capable of increasing the cornering power so as to improve the steering stability including the turning steering stability while enhancing the dry and wet grip performances and lowering tire noise.

According to one aspect of the present invention, a pneumatic tire comprising a tread part having one circumferential wide groove continuously extending in the circumferential direction is provided wherein a centroid of a cross-section of the circumferential wide groove deviates from the tire's equatorial plane so as to divide the tread part into a narrow tread section and a broad tread section, wherein, one of the groove walls of the circumferential wide groove extends along a curve convex outwardly in the tire radial direction from one of the bottom edge of the circumferential wide groove and is smoothly connected to the outer surface of the tread part, and wherein, when the tire is mounted on a regular rim, inflated with regular internal pressure and applied with normal load, a groove width GW of the circumferential wide groove is defined to be not less than 35 mm and not more than 0.35 times the ground contact width TW of the tread part.

The other one of the groove walls of the circumferential wide groove may extend approximately straight from the other bottom edge of the circumferential wide groove so as to cross the outer surface of the tread part. The broad tread section may be provided with a circumferential fine groove with a groove width W1 of 1.5 to 7 mm. The arcuate groove wall of the circumferential wide groove is preferably connected to the outer surface of the broad tread section.

BRIEF DESCRIPTION OF THE DRAWINGS

The present invention will now be described, by way of example, referring to the attached diagrammatic drawings, in which:

FIG. 9 is a sectional view showing a configuration of the tread in a conventional tire.

DETAILED DESCRIPTION OF THE INVENTION

Figure 1:
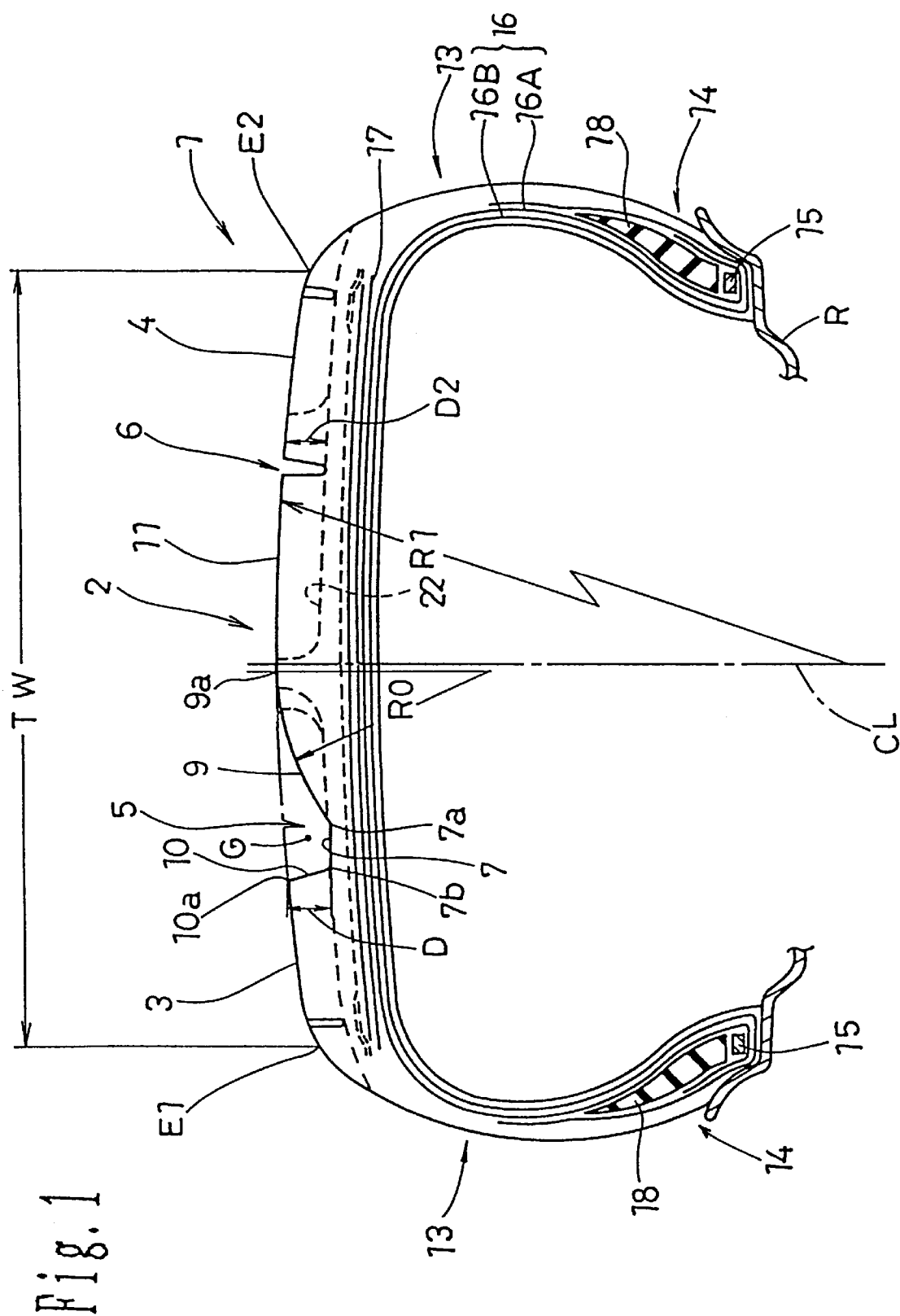
FIG. 1 is a sectional view showing an embodiment of the invention.

FIG. 1 shows a tire 1 of the present invention in its normal state mounted on its regular rim R and inflated with regular internal pressure. The regular rim is the rim officially approved for the tire by for example JATMA (Japan), TRA (USA), ETRTO (Europe) and the like; the regular internal pressure is the maximum air pressure for the tire officially specified in Air-pressure/Max.-loads Table by for example JATMA, TRA, ETRTO and the like; and a normal load is the maximum load for the tire officially specified in Air-pressure/Max.-loads Table by for example JATMA, TRA, ETRTO and the like.

The tire 1 comprises a pair of bead parts 14 each having a bead core 15, sidewall parts 13 extending from the bead parts 14 outwardly in the tire radial direction, and a tread part 2 linking their outer ends. The aspect ratio is between 0.4 and 0.6 to provide low aspect tire for passenger vehicles. (Aspect ratio=sectional height/tire width.)

A radial carcass 16 comprising two plies 16A, 16B extends between the bead parts 14. Both edges of the carcass 16 are folded back from inside to outside one around the bead core 15, and a belt layer 17 is provided above the carcass 16 and radially inwards of the tread part 2.

In addition, a rubber bead apex 18 extending radially outward from each bead core 15 is provided between the main part of the carcass 16 and the folded back part thereof so as to maintain the shape and rigidity of the bead part 14.

The belt layer 17 comprises plural belt plies of cords aligned at an angle of 15 to 30 degrees to the tire equator and coated by a topping rubber. The belt cords have a high tensile strength, such as steel or an aromatic polyamide, and are arranged to cross each other between the belt plies. For the carcass cords, in the case of a tire for passenger vehicles, such organic fiber cords as nylon, rayon and polyester may be generally employed.

The tread part 2 has one circumferential wide groove 5 formed asymmetrically in the groove sectional shape and continuously extending substantially in the circumferential direction.

The circumferential wide groove 5 comprises a groove bottom 7 being approximately parallel to the outer surface 11 of the tread part 2, an arcuate groove wall 9 extending along a curve convex outwardly in the tire radial direction from one groove bottom edge 7a of the groove bottom 7 so as to connect smoothly with the outer surface 11 of the tread part 2 at the upper wall point 9a, and an oblique groove wall 10 extending approximately straight from the other groove bottom edge 7b so as to cross the outer surface 11 of the tread part 2 at the upper wall point 10a.

Figure 4:
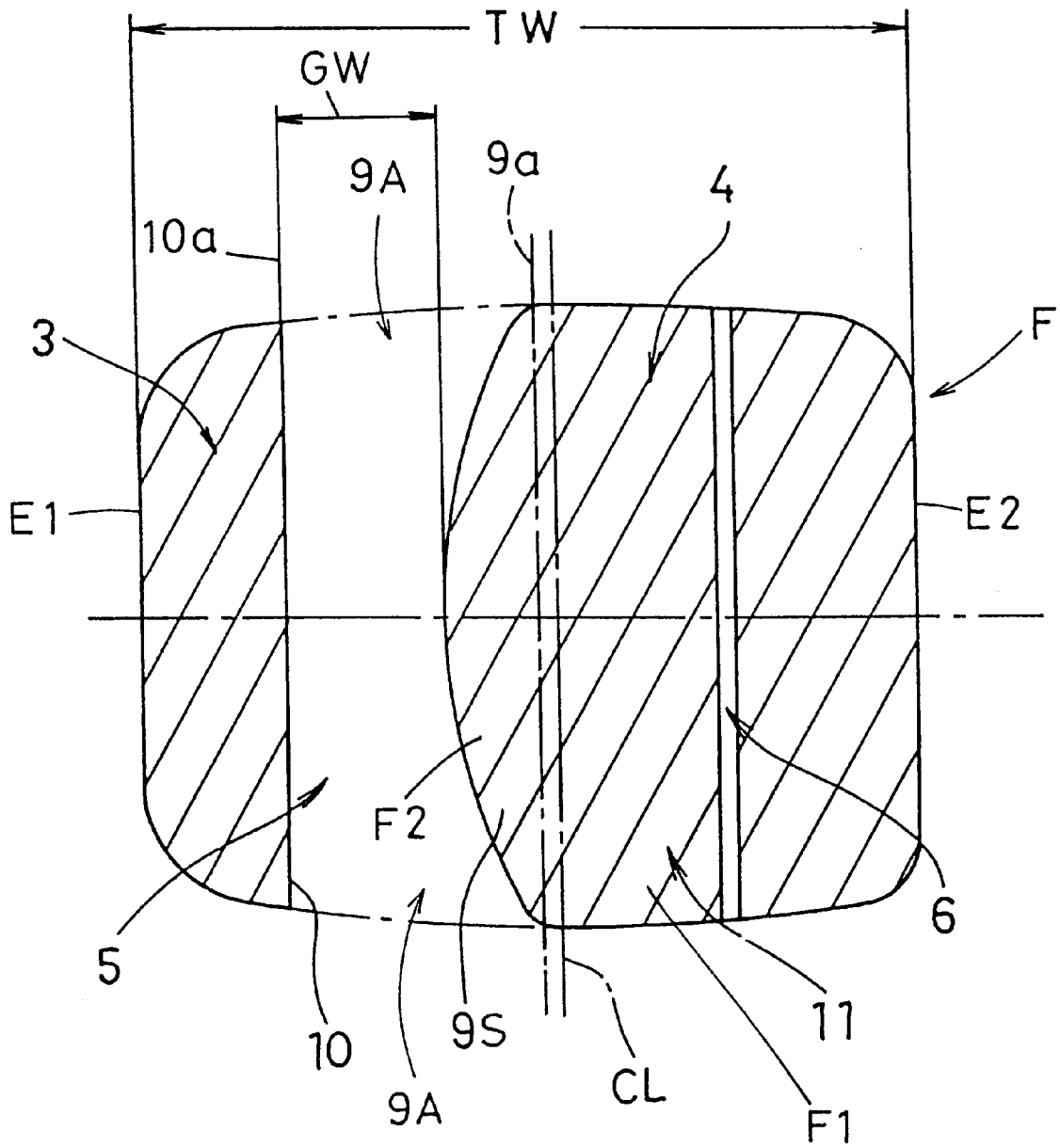
FIG. 4 is a plan view showing a ground-contacting tread area of the tire in FIG. 1 when a normal load is applied.

Incidentally, when a normal load is applied to the tire in the normal state, as shown in FIG. 4, a ground-contacting tread area F where the tread 2 contacts with the ground is obtained. The ground-contacting tread area F is composed of an area F1, where the outer surface 11 of the tread part 2 contacts with the ground, and an area F2, where an upper region 9S of the arcuate groove wall 9 contacts with the ground.

Then, a ground contact width TW of the tread part 2 is defined as a length between the axially outer ends of the ground-contacting tread area F, that is tread ends E1, E2. And a groove width GW of the circumferential wide groove 5, when a normal load is applied to the tire in the normal state, is defined as the length from the upper wall point 10a of the oblique groove wall 10 to the upper region 9S of the arcuate groove wall 9.

The configuration of the tread part 2 is formed in a single arc having the center on the tire's equatorial plane CL and a large radius of curvature R1. If this radius of curvature R1 is small, the ground contact area decreases, which may lead to a decline in the grip performance on a dry road surface, or the steering stability in cornering. The radius of curvature R1 is preferably 3 times or more of the ground contact width TW of the tread part 2, and its upper limit may be permitted until approaching a straight line parallel to the tire axis.

A groove depth D of the circumferential groove 5 measured from the groove bottom 7 to the outer surface 11 of the tread part 2 is set in a range of 4 to 8% of the ground contact width TW of the tread such as 7.5 to 15.0 mm, preferably 8.4 mm for a tire of 205/55R15 in size.

A centroid G of the groove sectional shape of the circumferential wide groove 5 deviates from the tire's equatorial plane CL, so that the tread part 2 is divided into a narrow tread section 3 and a broad tread section 4. In the embodiment, the centroid G of the groove sectional shape is disposed on the middle plane between the tire's equatorial plane CL and one tread edge E1, then, the arcuate groove wall 9 comes in contact with the outer surface of the broad tread part 4, and the oblique groove wall 10 crosses the outer surface of the narrow tread section 3.

By providing the tread part 2 into the narrow tread section 3 and the broad tread section 4 as mentioned above, the shape of the ground-contacting tread area F becomes asymmetrical to the tire's equatorial plane CL as shown in FIG. 4. By installing the thus formed tire in a vehicle so that the narrow tread section 3 may be positioned inside of the vehicle, the load is shifted to the broad tread section 4 when cornering. As a result, the tread part 2 positioned at the outside of the vehicle where the ground contact pressure is high in cornering is increased in the ground contact area and grounding rigidity, so that the steering stability in cornering and cornering performance may be enhanced.

On the other hand, since the groove depth D of the circumferential groove 5 is gradually increased as the upper region 9S of the arcuate groove wall 9 comes in contact with the ground, and since the circumferential groove has a wide width GW, the water discharge performance on the tread surface is improved, and the hydroplaning phenomenon is decreased, so that the wet grip performance may be enhanced.

Figure 2:
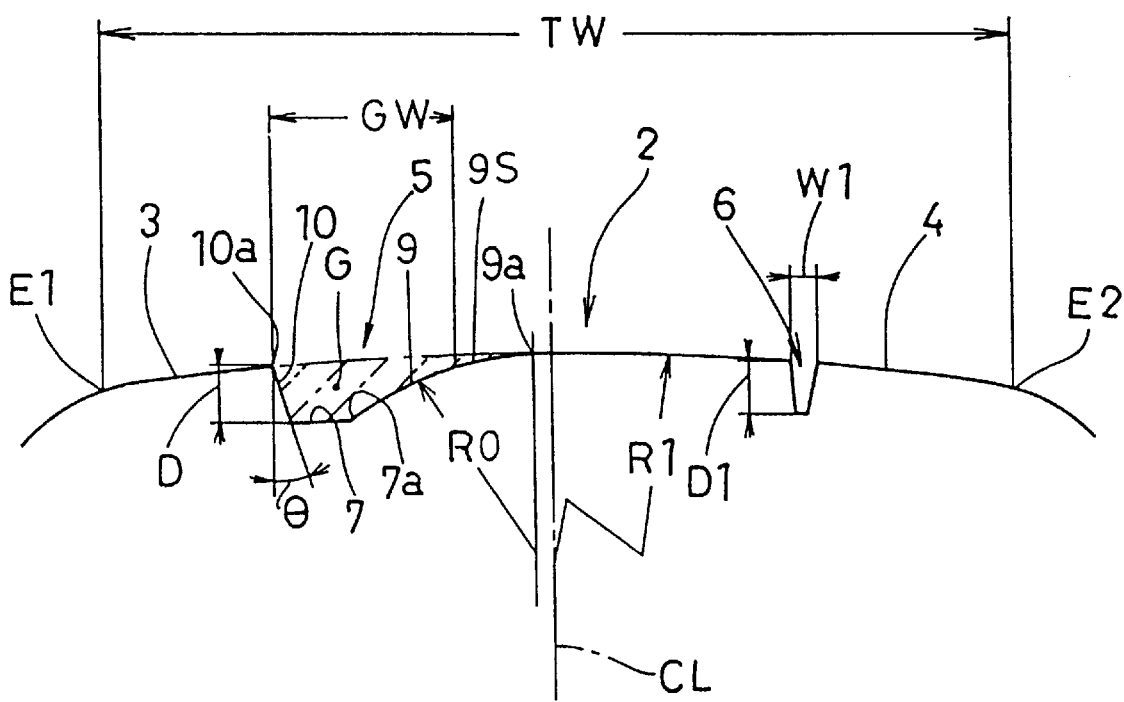
FIG. 2 is a enlarged sectional view showing a configuration of the tread part in FIG. 1.
Figure 3:
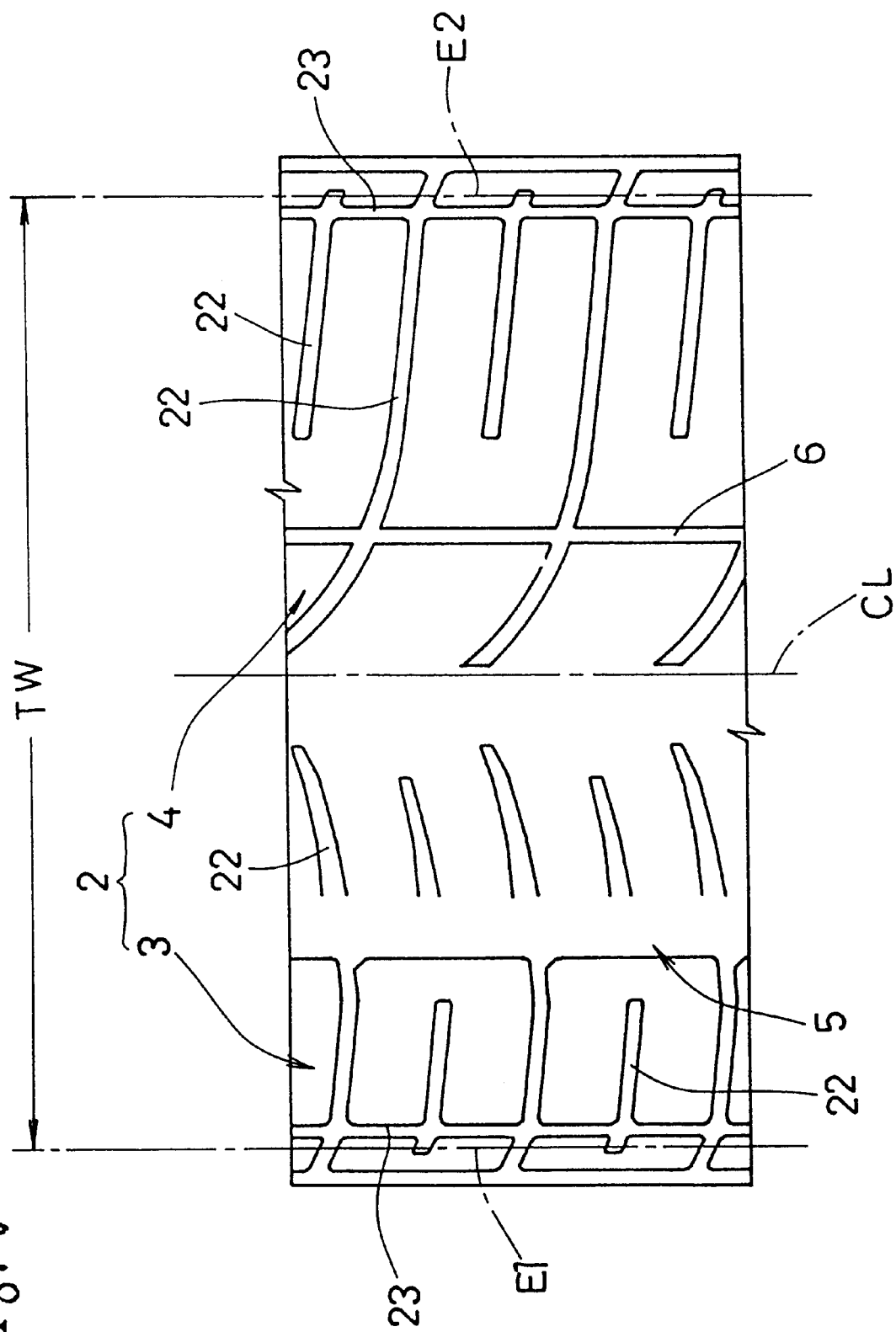
FIG. 3 is a partial flat view showing a tread pattern of the tire in FIG. 1.

In the embodiment, the arcuate groove wall 9 is formed by a single arc with a radius of curvature R0 as shown in FIGS. 1, 2, but may be formed in an elliptical arc or other quadratic curve, or may be formed by connecting two or more different convex curves smoothly.

The oblique groove wall 10 is also inclined at an angle θ of 15 degrees or less, or preferably 5 degrees or less to the normal on the outer surface 11 of the tread part 2, so that the edge effect with a road surface is provided at the upper wall point 10a to help maintain the dry grip performance by increasing a lateral force. In addition, by defining the angle θ within the above range, the dimensional change of the circumferential groove 5 due to the wear progress is suppressed. Meanwhile, the oblique groove wall 10 may be connected to the groove bottom 7 or to the outer surface 11 of the tread part 2 through an arc.

The groove width GW of the circumferential wide groove 5 is defined to be not less than 35 mm and no more than 0.35 times the ground contact width TW of the tread part 2.

Figure 5:
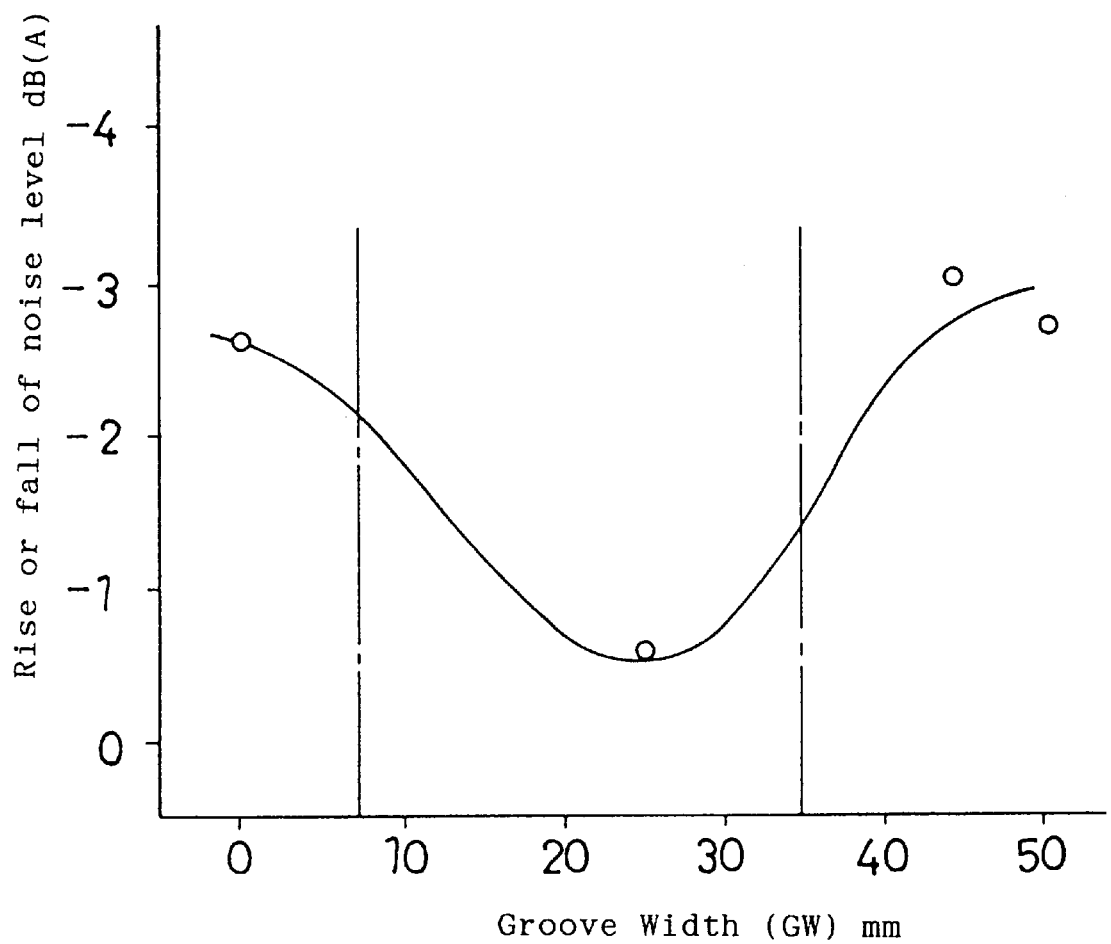
FIG. 5 is a graph showing the relation between the groove width and pass-by noise.

In defining the dimension of the groove width GW, the relation between the groove width GW and pass-by noise was investigated, and it was determined on the basis of its result. In the tire size of 205/55R15, as shown in FIG. 5, at the groove width GW of 7 to 35 mm, contribution to a reduction of the pass-by noise is small, but when the groove width GW is less than 7 mm or more than 35 mm, it was confirmed that a decrease of the pass-by noise was evident. Since the pass-by noise is attributable to the air column resonance, it varies with the size of the groove width GW itself, regardless of the tire size.

On the basis of this result, the groove width GW is defined at 35 mm or more. In addition, because the upper region 9S of the arcuate groove wall 9 comes in contact with the ground as mentioned above, the ground-contacting area F2 is provided with widened parts 9A at the front and the back of the ground-contacting center Q as shown in FIG. 4, thereby preventing air column resonance and decreasing the pass-by noise more effectively. Besides, if the groove width exceeds 0.35 times the ground contact tread width TW, the ground contact pressure becomes excessive, and the wear resistance is inferior and the durability is lowered.

The broad tread section 4 is provided with a fine groove 6 continuously extending straight in the circumferential direction in the embodiment. A width W1 of this fine groove 6 is defined in a range of 1.5 to 7 mm, and a groove depth D1 of the fine groove 6 is defined in a range of 0.4 to 0.9 times the groove depth D of the circumferential wide groove 5. In the embodiment, the fine groove 6 is positioned nearly on the middle plane between the tire's equatorial plane CL and other tread edge E2.

By providing such the fine groove 6, the pattern rigidity of the broad tread section 4 can be controlled properly, and the water discharge performance in the broad tread section 4 is further enhanced while providing a heat radiation effect and low noise characteristic. Incidentally, when the groove width W1 is larger than 7.5 mm, and the groove depth D1 is more than 0.9 times the groove depth D, air column resonance is generated which increases tire noise. On the other hand, when the groove depth D1 is less than 1.5 mm or less than 0.4 times the groove width D, the heat radiation effect is insufficient.

The fine groove 6 may be disposed at any desired position of the broad tread section 4 as required, and particularly by providing it at a symmetrical position relative to the circumferential groove 5 about the tire's equatorial plane CL, as in this embodiment, whereby the running stability is improved, especially in straight running performance.

Figure 6:
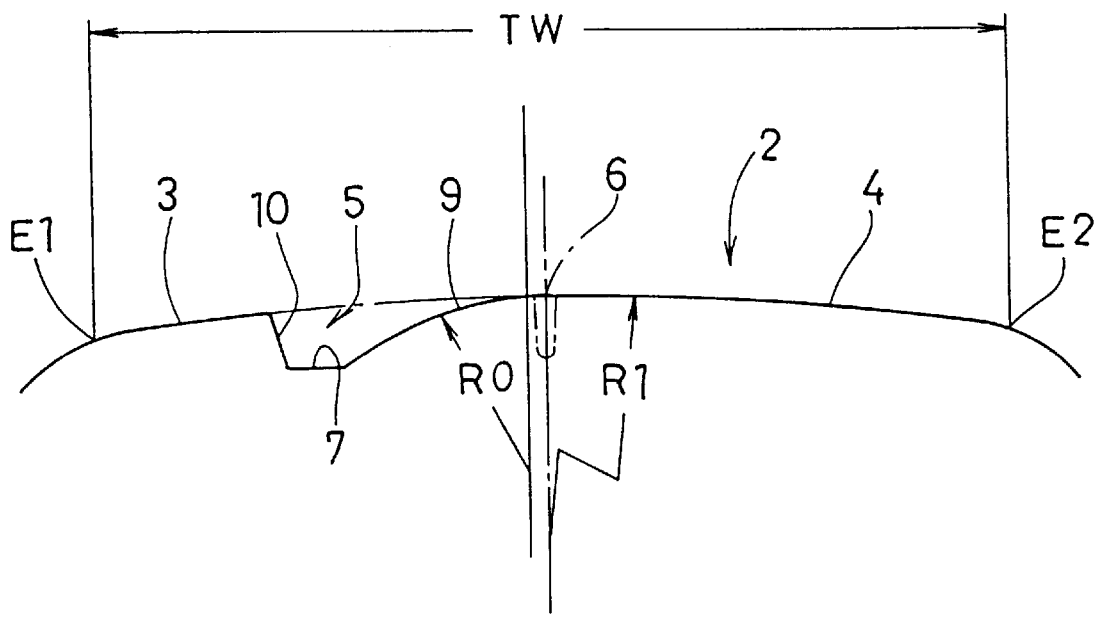
FIG. 6 is an enlarged sectional view showing another example of a configuration of a tread part.

The broad tread section 4, if the wet and dry grip performance can be sufficiently exhibited by one circumferential groove 5 only, may be formed without using a fine groove as seen in FIG. 6, or, as indicated by a single dot chain line in FIG. 6, the fine groove 6 may be disposed on the tire's equatorial plane CL. By disposing the fine groove 6 on the tire's equatorial plane CL, the water discharge performance is enhanced, and the wet grip performance may be further improved.

In the embodiment, the narrow tread section 3 and the broad tread section 4 are respectively provided with lateral fine grooves 22. The lateral fine grooves 22 extend toward the outside at an inclination angle of 10 degrees or more to the tire axial direction, and outer ends thereof open at the tread ends E1, E2. The lateral fine grooves 22 similarly have a grove depth D2 of 0.4 to 0.9 times the groove depth D of the circumferential wide groove 5. When the groove depth D2 is more than 0.9 times the groove depth D, or the inclination angle is less than 10 degrees, a pitch noise of the lateral fine groove 22 is excessively high. If the groove depth D2 is less than 0.4 times the groove depth D, a sufficient heat radiation effect cannot be expected.

In the lateral fine grooves 22, an angle established by a groove wall in the grooves 22 and a normal on the outer surface 11 of the tread part 2, that is, the inclination gradient of the groove wall is set at 15 degrees or less, more preferably 5 degrees or less, respectively. A dimensional change of the fine groove 22 due to the wear of the wear tire is thereby controlled.

In the embodiment, circumferential fine grooves 23, 23 having a similar construction to the circumferential fine groove 6 are disposed near the tread ends E1, E2, thereby further improving the steering stability in cornering.

Figure 7:
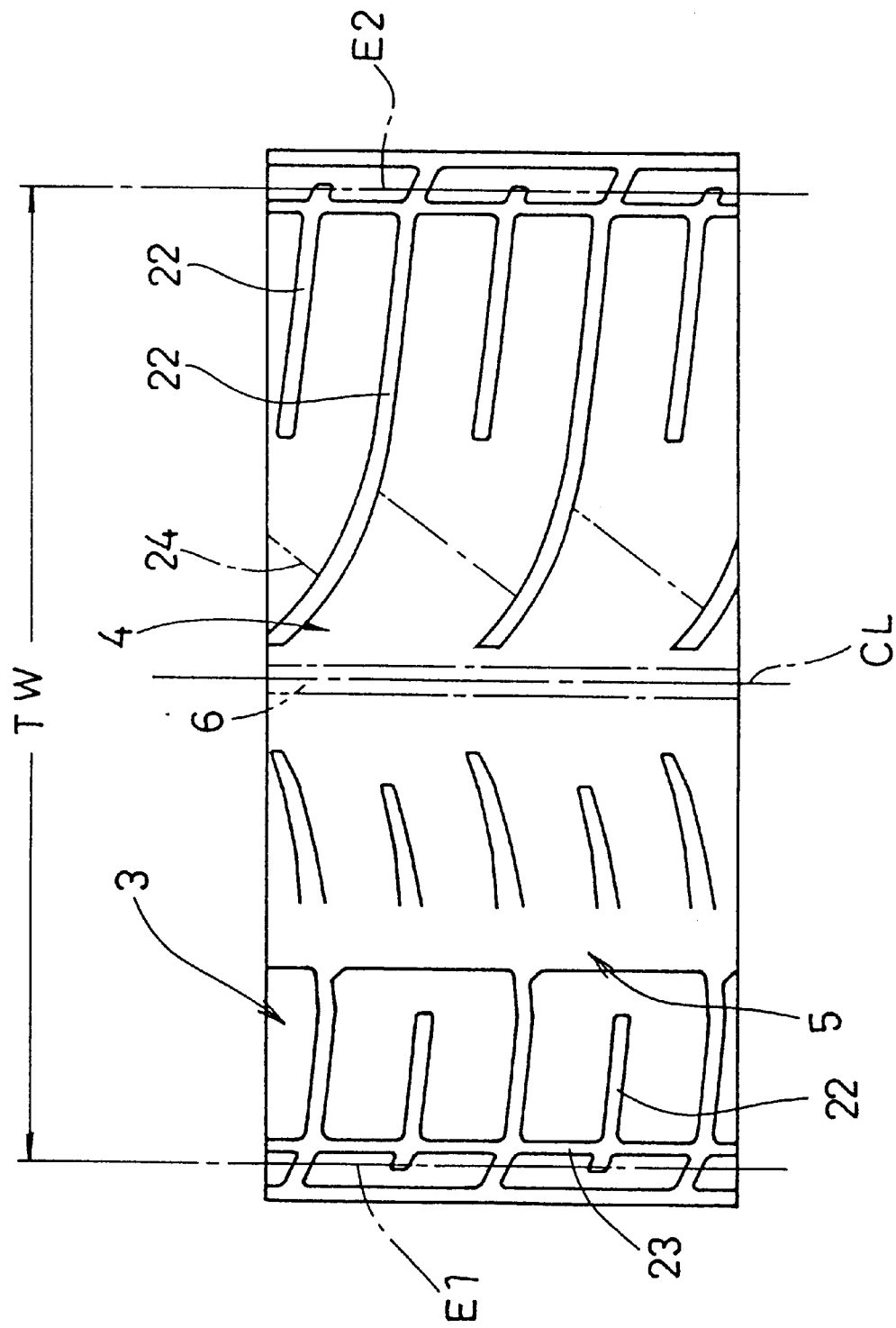
FIG. 7 is a partial flat view showing a tread pattern of the tire in FIG. 6.
Figure 8:
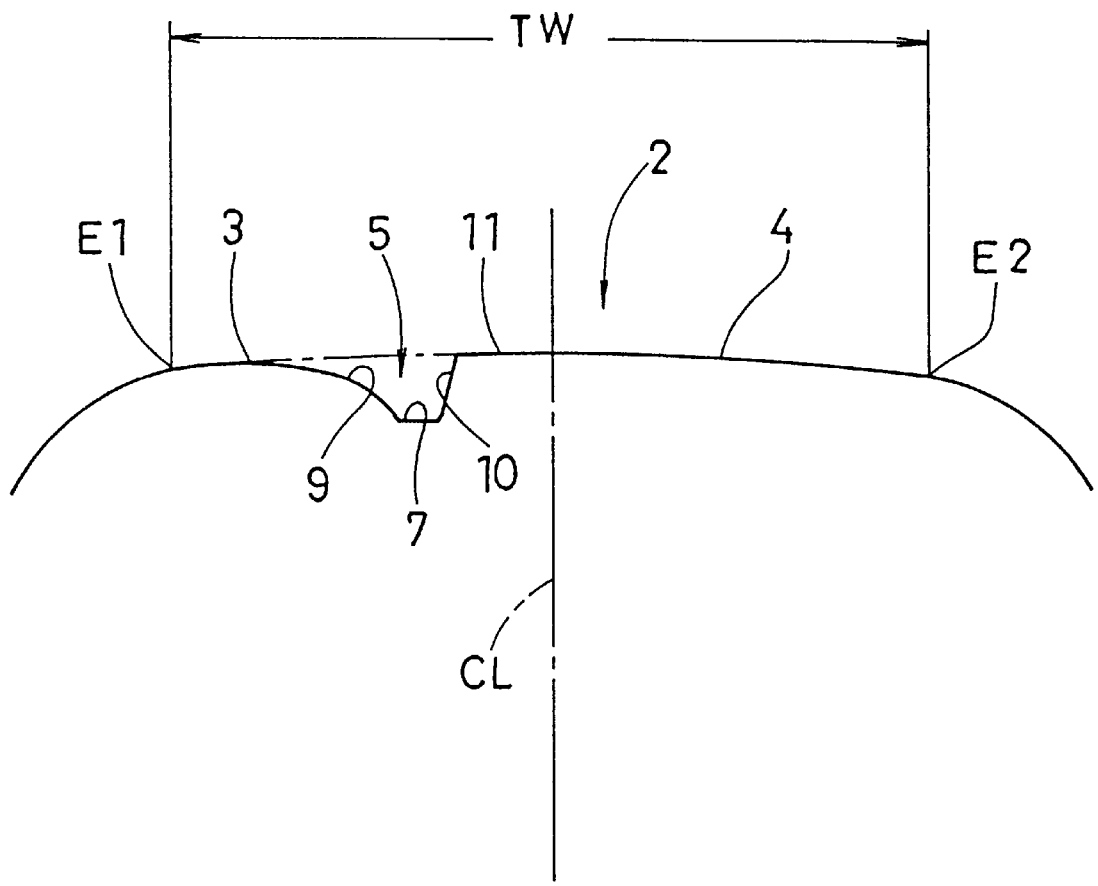
FIG. 8 is an enlarged sectional view showing still another example of a configuration of the tread part.

FIG. 8 shows an example of the configuration of the tread part 2. In the embodiment, the arcuate groove wall 9 comes in contact with the outer surface of the narrow tread section 3, and the oblique groove wall 10 crosses the outer surface of the broad tread section 4. The lateral fine grooves 22 provided on the narrow or broad tread sections 3, 4 may be connected to each other in the tire axial direction by a circumferential fine grove or sipes 24 having substantially no groove width, as shown in FIG. 7, and the invention may be modified in various modes.

EXAMPLE

A tire of 205/55R15 in size was produced according to specifications shown in Table 1, and measured for the pass-by noise, cornering power, hydroplaning-inducing speed and steering stability. The results of the measurement were compared and shown in the table. The tires were tested and measured in the state mounted on its regular rim R and inflated with regular internal pressure.

TABLE 1

Figure 10:
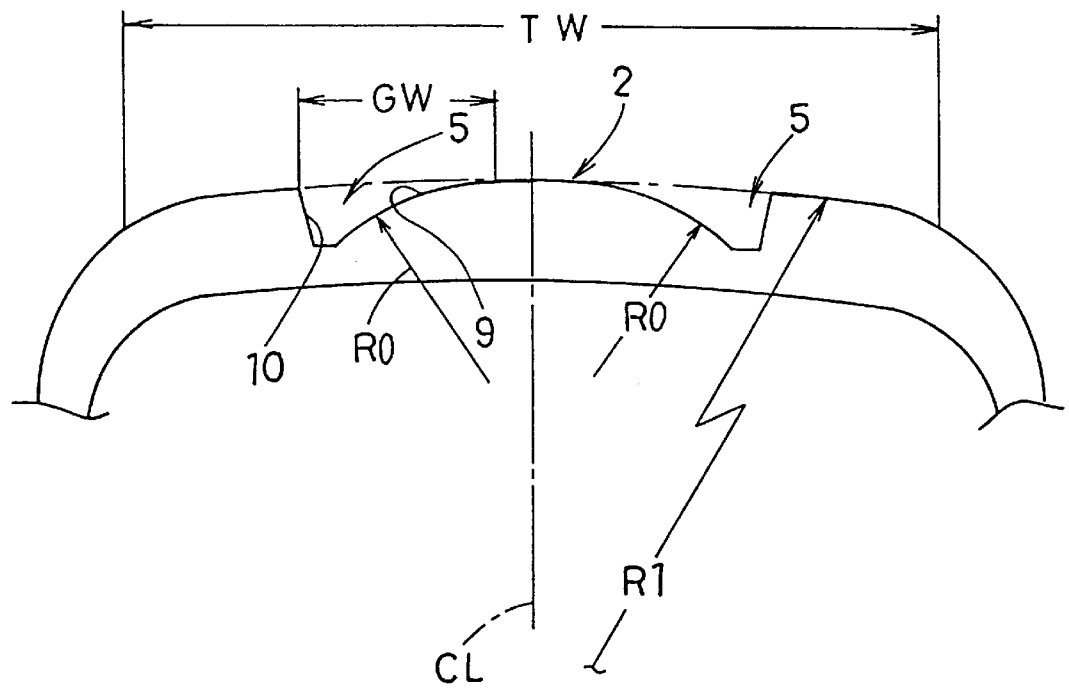
FIG. 10 is a sectional view showing a configuration of the tread in a comparative tire of Table 1.

|  | Embodiment | Embodiment 2 | Comparison 1 | Comparison 2 |
|---|---|---|---|---|
| Tread Profile | FIG. 6, 7 | FIG. 2, 3 | FIG. 10 | FIG. 9 |
| Ground-Contacting Tread Width (TW) mm | 168 | 168 | 168 | 168 |
| Circumferential Groove; |  |  |  |  |
| • Number of Wide Groove | 1 | 1 | 2 | |
| • Number of Fine Groove | — | 1 | — | 4 |
| • Total Number of Grooves | 1 | 2 | 2 | |
| • Groove Width (GW) mm | 38 | 38 | 38 | 9.5 × 2 |
| • Groove Width (W1) nm | — | 7 | — | 9 × 2 |
| • Groove Depth (D) mm | 10 | 10 | 10 | 10 |
| • Total Groove Width (ΣGW + ΣW1) mm | 38 | 45 | 76 | 37 |
| • Ratio (GW/TW) % | 22.6 | 22.6 | 22.6 | 5.5 |
| • Ratio(ΣGW + ΣW1)/TW % | 22.6 | 26.8 | 45 | 22 |
| Radius (R1) of Tread Surface mm | 520 | 520 | 520 | 520 |
| Radius (R0) of Arcuate Groove Wall mm | 85 | 85 | 85 | — |
| Pass-by Noise (dBA) | 72.0 | 72.5 | 71.5 | 73.8 |
| Cornering Power (index *1) | 105 | 104 | 89 | 100 |
| Hydroplaning-Inducing Speed (index *1) | 125 | 129 | 145 | 100 |

TABLE 1-continued

|  | Embodiment | Embodiment 2 | Comparison 1 | Comparison 2 |
|---|---|---|---|---|
| Steering Stability (index *2) |  |  |  |  |
| • Installing a tire to direct a broad tread section outward of a car. | 7 | 7 | 5 | 6 |
| • Installing a tire to direct a broad tread section inward of a car. | 6 | 6 |  |  |

*1 Indicated as the index with the comparison 2 taken as 100. The greater figure means the better performance.
*2 Indicated as the index 10 with the comparison 1 taken as 5. The greater figure means the better performance.

What is claimed is:

1. A tire comprising a tread portion including a pair of tread edges and only one wide groove extending continuously along a circumferential direction of the tire and having bottom edges, wherein
   a centroid of the cross-section of the circumferential wide groove is axially offset from an equatorial plane of the tire so as to divide the tread portion into a narrow tread section and a broad tread section, said broad tread section excluding said wide groove,
   said wide groove including:
      an arcuate groove wall extending along a curve convexed outwardly in the tire radial direction from one of the bottom edges of said wide groove and connecting smoothly to a radially outer surface of said broad tread section, and
      an oblique groove wall extending radially substantially straight from the other bottom edge of said wide groove and crossing the outer surface of the tread portion, and
   wherein in the tire footprint, when the tire is mounted on a regular rim, inflated with regular internal pressure and applied with a normal load, an axially inner groove edge formed by said arcuate groove wall is delineated in the tire footprint as a curve along the circumferential direction such that a width of said wide groove in the tire footprint narrows from a leading edge of the footprint to the ground-contacting center, and then widens therefrom to a trailing edge of the footprint, the groove width of said wide groove at a ground-contacting center being not less than 35 mm and not more than 0.35 times the ground contact width TW of said tread portion, and
   an axially outer groove edge formed by said oblique groove wall is delineated in the tire footprint as a straight line extending in the circumferential direction from the leading edge to the trailing edge.

2. The tire of claim 1, wherein said broad tread section further includes a fine groove extending continuously in the circumferential direction of the tire, said fine groove having a groove width in the range of 1.5 to 7 mm and a groove depth in the range of 0.4 to 0.9 times a depth of said wide groove.

3. The tire of claim 2, wherein said fine groove is positioned midway between said equatorial plane and one said thread edge.

4. The tire of claim 2, wherein said fine groove is positioned on said equatorial plane.

5. The tire of claim 1, wherein the centroid of the cross-section of said wide groove is positioned midway between said equatorial plane and one said tread edge.

6. The pneumatic tire of claim 1, wherein said oblique groove wall is inclined at an angle of 15 degrees or less to the normal on the outer surfaces of the tread.

7. The tire of claim 1, wherein:
   said broad tread section includes only two said fine grooves,
   one of said only two fine circumferential grooves being disposed on an opposite side of said equatorial plane from said wide groove in a region from approximately a middle plane of said broad tread section to said equatorial plane,
   the other of said only two fine grooves being disposed near and axially inside a tread end, and
   said narrow tread section including only one fine groove disposed near and axially inside a tread end.

8. The tire of claim 1, wherein said broad tread section includes only one fine groove disposed near and axially inside the tread end, and said narrow tread section includes only one fine circumferential groove disposed near and axially inside the tread end.

9. The tire of claim 1, wherein said arcuate groove wall of said wide groove has a plurality of lateral grooves extending from the bottom edge of said wide groove and terminating at an upper region of said arcuate groove wall capable of contacting the ground.

10. The tire of claim 9, wherein said plurality of lateral grooves includes:
    first lateral grooves terminating near a lower end of said upper region of said arcuate groove wall capable of contacting the ground and
    second lateral grooves terminating near an upper end of said upper section of said arcuate groove wall,
    wherein said first and second lateral grooves alternate with each other along the circumferentail direction of the tire.

11. The tire of claim 1, wherein said broad tread section includes lateral fine grooves connected to each other by circumferential sipes.

12. A tire comprising:
    a tread portion including
    only one wide groove formed in said tread portion, said wide groove extending continuously in a circumferential direction of the tire, said wide groove having bottom edges, a centroid of a cross-section of said wide groove being disposed approximately equidistant between an equatorial plane of the tire and an edge of said tread portion so as to divide the tread portion into a narrow tread section and a broad tread section, only one of the groove walls of said wide groove extending along a curve convex outwardly in a radical direction of the tire from one of said bottom edges of said wide groove and being smoothly continuous with a radically outer surface of said broad tread section, and
    only one fine groove disposed on the opposite side of the equatorial plane from said wide groove in a region between approximately an axial middle plane of said broad tread section and the equatorial plane, said fine groove extending continuously in the circumferential direction of the tire, wherein, in the tire footprint when the tire is mounted on a regular rim, inflated with regular internal pressure and applied with a normal load, a minimum groove width of the side groove is not less than 35 mm and not more than 0.35 times the ground contact width of the tread portion, and the width of the fine groove is between 1.5 and 7 mm.

13. A combination of a vehicle and a pneumatic tire mounted on the vehicle, comprising:

a vehicle, and a pneumatic tire mounted on the vehicle and comprising a tread portion having a pair of tread edges and only one wide groove extending continuously in a circumferential direction of the tire and having bottom edges, wherein a centroid of a cross-section of the circumferential wide groove deviates from an equatorial plane of the tire so as to divide said tread portion into a narrow tread section and a broad tread section, said broad tread section excluding said wide groove, said wide groove including an arcuate groove wall extending along a curve convexed outwardly in the tire radial direction from one of said bottom edges of said wide groove and connecting smoothly to a radially outer surface of said broad tread section, and an oblique groove wall extending radially substantially straight from the other said bottom edge of said wide groove and crossing the radially outer surface of said tread portion, and wherein in the tire footprint, when the tire is mounted on a regular rim, inflated with regular internal pressure and applied with a normal load, an axially inner groove edge formed by said arcuate groove wall is delineated in the tire footprint as a curve along the circumferential direction such that a width of said wide groove in the tire footprint narrows from a leading edge of the footprint to the ground-contacting center, and then widens therefrom to a trailing edge of the footprint, the groove width of said wide groove at a ground-contacting center being not less than 35 mm and not more than 0.35 times the ground contact width TW of said tread portion, and an axially outer groove edge formed by said oblique groove wall is delineated in the tire footprint as a straight line extending in the circumferential direction from the leading edge to the trailing edge.

* * * * *